Sept. 23, 1969     H. A. ZOLLINGER     3,468,417
COMPOST SEPARATOR APPARATUS
Filed June 29, 1967
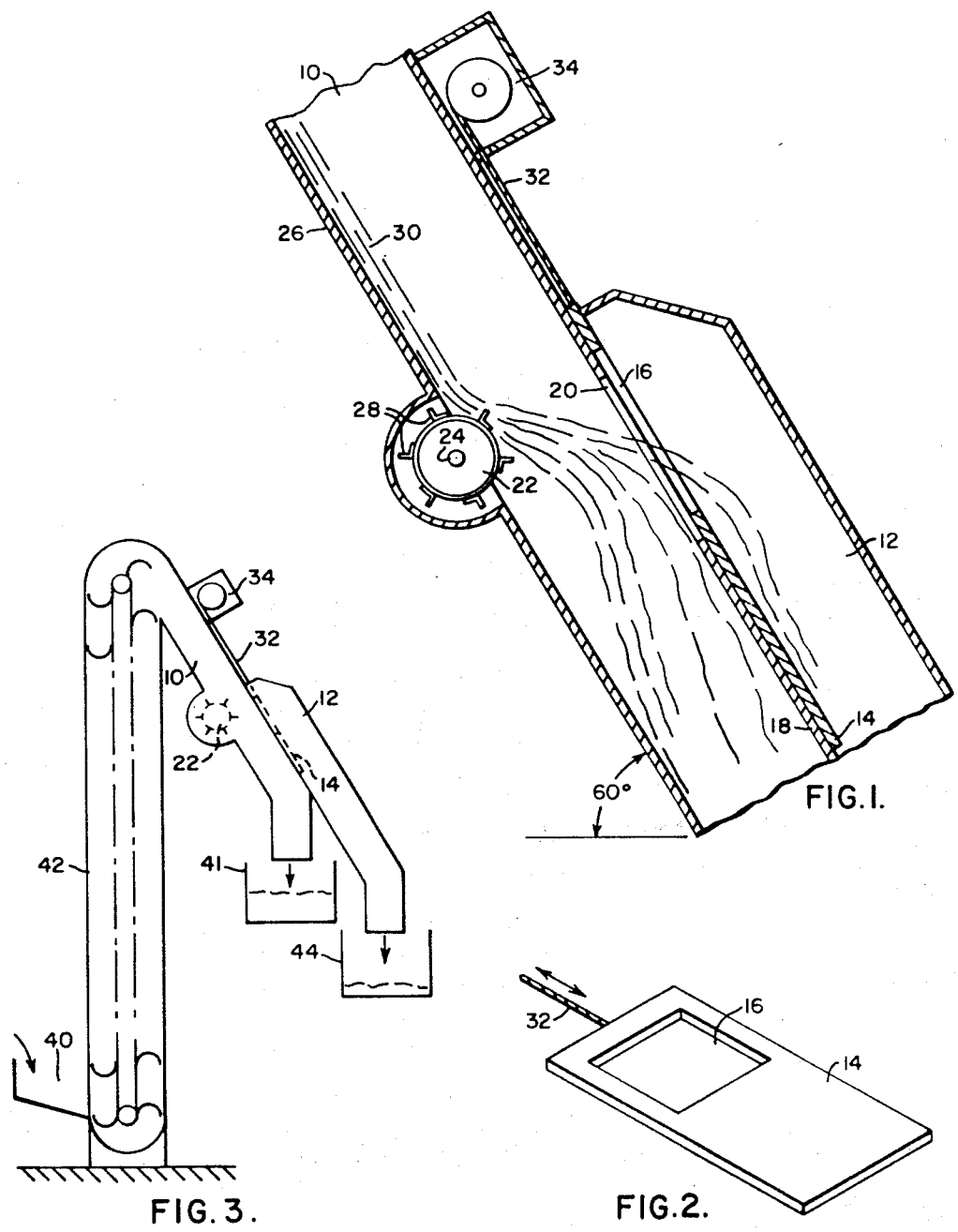
INVENTOR
Howard A. Zollinger
BY
ATTORNEY United States Patent Office 3,468,417
Patented Sept. 23, 1969

3,468,417
COMPOST SEPARATOR APPARATUS
Howard A. Zollinger, Williamsville, N.Y., assignor to Westinghouse Electric Corporation, Pittsburgh, Pa., a corporation of Pennsylvania
Filed June 29, 1967, Ser. No. 650,096
Int. Cl. B07b 13/04
U.S. Cl. 209—120                    6 Claims

ABSTRACT OF THE DISCLOSURE

In accordance with the present invention, a compost separator is provided to ballistically separate the output product compost of a refuse reclamation system to yield a desired compost product suitable for bagged sales and the garden nursery market as a consistent product, with the removal of undesired pieces of plastic, wood, metal and significant sized pieces of glass. The output product compost from the system is supplied to drop by gravity down an inclined first chute, with a paddle wheel type of rotating ballistic separator apparatus being provided to rotate within this first chute and about an axis located a predetermined distance from the bottom of the first chute such that desired low mass and low density compost particles travel through and past the separator apparatus to the end of the first chute where output loading or bagging equipment is located. On the other hand, undesired high mass and high density particles are rejected into a second chute and are thereby separated from the compost material leaving the end of the first chute. The rotational speed, the diameter of the involved cylindrical drum, the size of the attached flinger members and the location of the ballistic separator apparatus in relation to the depth of the compost material passing down the inclined first chute are selected to improve the objective operation of the compost particle ballistic separator apparatus.

Cross reference to related applications

The present invention is related to the invention entitled "A Refuse Reclamation System" that is disclosed in copending patent application Ser. No. 650,095, filed June 29, 1967 by H. A. Zollinger (Case 39,113) and assigned to the same assignee.

Background of the invention

To prepare compost for bagged sales in the nursery trade demands a consistent product with undesired pieces of plastic, wood, metals and significantly sized glass pieces being removed. Some prior art compost treatment plants use particle screening equipment and magnetic head pulleys to remove the magnetic material from the finished compost product after screening. However, the compost separator apparatus of the present invention overcomes the shortcomings of the prior art approaches and does it in a more efficient and more reliable manner with less capital cost and lower operating expenses.

Summary of the invention

In accordance with the present invention the product compost is elevated by a bucket elevator or conveyor to a first chute operative with a paddle wheel type ballistic separator apparatus. The compost product material is caused to travel in a predetermined flow down the first chute onto the rotating paddle wheel where the attached flinger bars on the periphery of the rotating paddle wheel strike the compost particles. The desired output product compost particle is a low mass and low density particle and excludes the larger and more dense pieces which are here rejected. The desired compost material travels down a first chute past the ballistic separator apparatus to a feeder screen or loading equipment such as bagging equipment at the end of the first chute. The rejected compost material is thrown by the paddle wheel over the top of an adjustable gate member and down a second or reject chute. A small winch device above the position of the paddle wheel provides the desired adjustment in the position of the gate member to raise or lower the gate member to control the rejection of unwanted compost particles. In relation to the magnitude or size of the particle to be rejected in the treatment of compost that has been screened, for example through a ½ inch screen or to reject that compost material which has gone through a ¾ inch screen, the adjustment in the position of the gate member in conjunction with the rotating speed of the paddle wheel provides the desired flexibility in the selective operation of the ballistic separator apparatus.

The design of the ballistic separator has been chosen in regard to the diameter of the paddle wheel drum, the size of the flinger bars, the speed of rotation of the drum or paddle wheel and the location of the drum in relation to the path of the sliding compost material passing down the first chute.

Some of the factors for the failure of prior art separators of this same general type are in the improper choice of the size of the flinger bars, the speed of the drum and the absence of the adjustable gate member. The here disclosed apparatus overcomes these prior art deficiencies by providing a device which has adequate speed to throw the undesired large or more dense compost particles into the reject chute and not enough speed to create a fan action that tends to blow a significant amount of the desired compost particles into the reject second chute.

Brief description of the drawings

FIGURE 1 is a schematic showing of the compost separator apparatus of the present invention;

FIG. 2 is a more detailed showing of the adjustable gate member; and

FIG. 3 is a diagrammatic showing of the rotating cylinder drum of the present invention in relation to the adjustable gate member and the first and second chutes.

Description of preferred embodiment

In FIG. 1 there is schematically shown the compost separator apparatus of the present invention including a first chute 10, a second chute 12 and an adjustable gate 14 which is slidable to vary the position of opening 16 to adjust the effective size of the passage between said first chute 10 and the second chute 12. The wall 18 of the first chute 10 includes an opening 20 which is cooperative with the opening 16 in the adjustable gate 14 such that longitudinal adjustment of the gate member 14 is utilized to control the physical size of the resultant passage and thereby the density of the undesired particles which are in practice passed into the reject second chute 12.

A rotating cylindrical drum 22 for one practical embodiment that was constructed had a diameter in the order of twelve inches and was rotatable about an axis 24 positioned about two inches from the plane of the bottom 26 of the first chute 10. The rotational speed of the drum 22 was in the order of 200 r.p.m. A plurality of flinger bars 28, each having a height in the order of two inches above the surface of the drum 22, are provided around the periphery of the drum 22 such that the refuse material particles 30 which flow down the bottom surface 26 of the first chute 10 in the order of a depth of two or three inches are physically thrown by the flinger bars 28 in the direction of the opening 16, with the effective size of the resulting passage from the first chute 10 into the second chute 12 being determined by longitudinal adjustment of the gate member 14, in accordance with the physical size and density of undesired particles to be rejected. The smaller and lower mass desired particles are thrown by the flinger bars 28 such that the substantial portion of these particles do not go through the passage into the second chute 12 but instead remain within the first chute 10 and continue to fall to the ends of the first chute 10 where they are bagged or loaded as may be desired for commercial sale. The undesired particles which pass to the lower end of the second chute 12 can be recycled through a selected one of the grinders of the cooperative refuse reclamation system, or a separate grinder can be provided for this purpose, and then pass rescreened or even passed through at least the second digest stage of the refuse reclamation system described in the referenced copending patent application if desired.

In FIG. 2 there is provided a more detailed showing of the gate member 14 to better show the opening 16. A rope 32 is operative with a winch 34, as shown in FIG. 1, to adjust the relative position of the gate member 14 to determine the rejection of the undesired particles.

In FIG. 3 there is diagrammatically shown the rotating cylindrical drum 22 positioned in the inclined first chute 10 and relative to the second chute 12 with the adjustable gate member 14 being operative with the rope 32 and the winch 34 for determining the separation of undesired refuse material particles which pass into the second chute 12 as compared to desired refuse material particles which remain in the first chute 10.

In the operation of the compost separator apparatus shown in FIGS. 1, 2 and 3, the infeed compost material particles including the undesired large size and higher mass particles as well as the desired smaller size and lower mass particles are supplied to the input 40 of a suitable lifting device such as a bucket elevator 42, as shown in FIG. 3, which elevator raises the compost material and supplies the material particles in a controlled flow two or three inches deep down the inclined first chute 10 leading to the paddle wheel type ballistic separator 22. The refuse material particles travel down the inclined first chute 10 onto the rotating paddle wheel drum 22 where the provided flinger bars 28 on the periphery of the paddle wheel drum 22 strike and throw the compost material particles. The desired particles are low mass and low density while the undesired particles are larger mass and more dense. The desired material particles travel down the first chute 10 and are not thrown by the rotating drum 22 through the passage into the second chute 12 and instead they continue traveling down the first chute 10 to a receiving equipment 41 which may include a feeder screen or loading equipment or compost bagging device as provided at the bottom end of the first chute 10. The undesired and rejected material particles are thrown over the top of the adjustable gate 14 into the second chute 12 and then pass down the reject second chute 12 to a suitable equipment 44 such as a container. The winch 34 provides the desired longitudinal adjustment of the gate member 14 to determine the size and density of the unwanted material particles that pass into the second chute 12.

One actual embodiment of the present compost separator apparatus actually built and commercially operated included a rotating drum having a diameter of twelve inches, a length of fifteen inches and rotatable about an axis position two inches below the bottom plane of the first chute 10. The drum was rotated clockwise at a speed of 200 r.p.m., with the flinger bars 28 being two inches in height above the outer surface of the drum 22. The first chute 10 and the second chute 12 were inclined at an angle of 60° from the horizontal. The first chute 10 had a height of 1 foot 10¾ inches. The second chute 12 had a height of 1 foot 6 inches with each of the first and second chutes 10 and 12 having a width approximately the same as the length of the rotating drum 22. Each of opening 16 and opening 20 was in the order of 24 inches in length. Particles of the more dense material in the order of a ¼ inch cube and greater, and pieces of wood in the order of ½ inch long and ¼ inch thick and wide and larger were rejected by this apparatus in actual practice.

One intended function of the illustrated compost separator apparatus is to remove any material that would make the compost unattractive for use as it is sold to either nurserymen, orchard growers, or highway landscapers. The highway landscapers use hydro seeders which are very high speed and high pressure pumps that take a slurry of compost or like material, fertilizer, and seed and blow it on the bank of a new highway project. This operation is very fast and allows the people to bid much lower on the seeding projects. For this operation any brass, copper, aluminum, steel, or hard plastics remaining in the compost can jam or ruin the hydro seeder and, therefore, such compost would not be used for that potential marker. The ballistics separator does an excellent job to get rid of such materials that got into the compost of a high density or high strength material. Additionally, as the compost sits out in the storage yard a number of things can get into it such as pop cans, a nut or a bolt, or copper fittings from a water pipe, or other foreign objects. The illustrated apparatus will separate the compost from these foreign objects before it is loaded into the customer's truck or into bags.

The adjustable gate that is used as part of the ballistic separator has the function of determining what material will be separated out of the compost. If the gate is lowered to its fullest down position a lot of the good compost material such as the cellulose and similar fibers are thrown out and this is not desirable. As the gate is raised it retains the desired compostable materials, cellulose being one, however it will still get rid of the pop cans, nuts, bolts, copper fittings, large pieces of glass and the like.

In actual practice it has been found to be quite adequate to adjust the gate during a typical run of the compost and leave the gate set for a significant period of time.

In practice the gate has been adjusted to cause the separator to actually throw out undesired objects that are in the order of ¼ inch square and larger very easily, and sometimes it will throw out something that is only about ⅛ inch cubed if it is a very high density item.

The present invention has been described with a certain degree of particularity, however it should be understood that various modifications and changes can be made in the arrangement and operation of the individual parts without departing from the scope and spirit of the present invention.

I claim as my invention:

1. In separator apparatus operative with mixture of particles for rejecting undesired higher mass particles, the combination of (a) a first chute for providing a downward predetermined first flow path for all of the particles including the desired lower mass particles and the undesired higher mass particles, said first chute being inclined at a predetermined angle to the horizontal, (b) a second chute located adjacent to the first chute for receiving said undesired particles for downward flow along a predetermined second path, (c) a movable separator device positioned within said first chute to reject said undesired compost particles and having a predetermined movement speed such that the undesired particles are flung into said second chute and said desired particles fall short of the second chute and continue downward in the first chute, (d) an adjustable height gate member so positioned between said first chute and said second chute that particles flung by the separator device must hurdle the gate device to gain entry into the second chute thus to control the size and density of the undesired particles that are thrown into said second chute.

2. The separator apparatus of claim 1, including:
(e) said movable separator device being rotatable at a predetermined speed about an axis substantially transverse to said first path such that said undesired higher mass particles are thrown toward said second chute by an amount sufficient to pass over said gate member and said desired lower mass particles are not thrown by an amount sufficient to pass over said gate member.

3. The combination as in claim 1 wherein said mixture comprises compost particles.

4. Apparatus operative with a particle mixture for separating higher mass particles from lower mass particles comprising:
(a) a first inclined chute for providing a predetermined downward flow path for particles;
(b) a second inclined chute adjacent to and overlying at least a portion of the first chute, said chutes being inclined in the same direction;
(c) partition means separating the first chute from the second chute;
(d) said partition means having adjustable aperture defining means forming an opening with a lower edge, which opening provides communication between said chutes;
(e) a paddle wheel type ballistic separator disposed within the first chute and rotatable about an axis transversely of said path for flinging particles that are traveling down said path in the direction of said opening, whereby at a given speed of the ballistic separator higher mass particles are flung through said opening into the second chute, while lower mass particles fall short of said lower edge of the opening and continue downward in the first chute; and
(f) means for adjusting the height of said lower edge, thus to control the separation of said particles in accordance with desired mass ratios.

5. The combination as in claim 4, wherein said particle mixture comprises compost particles.

6. The combination as in claim 4, wherein the first chute has an inclined floor defining said downward flow path, and said axis is disposed below the plane of said floor.

References Cited

UNITED STATES PATENTS

| 277,530 | 5/1883 | Ziegler | 209—115 X |
|---|---|---|---|
| 2,274,887 | 3/1942 | Collier | 209—120 X |

M. HENSON WOOD, Jr., Primary Examiner

R. A. SCHACHER, Assistant Examiner